(12) United States Patent
Becker (10) Patent No.: US 7,051,061 B2
(45) Date of Patent: May 23, 2006

(54) DUAL USE DUAL COMPLEX MULTIPLIER AND COMPLEX DIVIDER

(75) Inventor: Peter E. Becker, Coatesville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/744,829

(22) Filed: Dec. 23, 2003

(65) Prior Publication Data

US 2004/0139140 A1   Jul. 15, 2004

Related U.S. Application Data (63) Continuation of application No. 10/322,160, filed on Dec. 18, 2002, now Pat. No. 6,691,144.

(60) Provisional application No. 60/383,686, filed on May 28, 2002.

(51) Int. Cl.
*G06F 7/38* (2006.01)
*G06F 7/52* (2006.01)

(52) U.S. Cl. .................................. 708/511; 708/622

(58) Field of Classification Search ............... 708/520, 708/523, 511, 524, 607, 620, 622, 650, 653, 708/654
See application file for complete search history.

(56) References Cited

U.S. PATENT DOCUMENTS

| | | | |
|---|---|---|---|
| 3,562,505 A | 2/1971 | Barlow, Jr. et al. | |
| 4,354,249 A | 10/1982 | King et al. | 708/622 |
| 4,779,218 A | 10/1988 | Jauch | 708/520 |
| 6,411,979 B1 | 6/2002 | Greenberger | 708/622 |
| 6,691,144 B1 * | 2/2004 | Becker | 708/622 |

OTHER PUBLICATIONS

Hwang et al., "Multiprocessors for Evaluating Compound Arithmetic Functions", Proceedings of the Symposium on Computer Arithmetic, vol. Symp. 7, IEEE Computer Society Press, New York, Jun. 4, 1985, pp. 266-275.
Prasad et al., "Half-rate GSM Vocoder Implementation on a Dual Mac Digital Signal Processor", 1997 IEEE International Conference on Acoustics, Speech, and Signal Processing, 1997, ICASSP-97, IEEE Comput. Soc., USA, vol. 1, Apr. 21, 1997, pp. 619-622.

* cited by examiner

*Primary Examiner*—Chuong D. Ngo
(74) *Attorney, Agent, or Firm*—Volpe & Koenig, P.C.

(57) ABSTRACT

A circuit is capable of performing a complex division and dual complex multiplication. The complex division involves dividing a first complex value by a second complex value and the dual complex multiplication involves multiplying a third complex value by a fourth complex value and a fifth complex value by a sixth complex value. The circuit comprises a first input configured to receive the first and second complex values when the circuit is performing the complex division and the third and fourth complex values when the circuit is performing the dual complex multiplication. A second input is configured to receive the second complex value when performing the complex division and the fifth and sixth complex values when performing dual complex multiplication. A first output produces a result of complex multiplication of the third and fourth complex values when the circuit is performing the dual complex multiplication. A second output produces a result of the complex division of the first complex value divided by the second complex value when the circuit is performing the complex division and complex multiplication of the fifth complex value by the sixth complex value when performing the dual complex multiplication.

9 Claims, 4 Drawing Sheets

DUAL USE DUAL COMPLEX MULTIPLIER AND COMPLEX DIVIDER

CROSS REFERENCE TO RELATED APPLICATION(S)

This application is a Continuation of U.S. Pat. No. 10/322,160, filed Dec. 18, 2002, now U.S. Pat. No. 6,691,144 issued Feb. 10, 2004, which in turn claims priority from U.S. Provisional No. 60/383,686, filed May 28, 2002, which are incorporated by reference as if fully set forth.

BACKGROUND

This invention generally relates to electronic circuits. In particular, the invention relates to performing dual complex multiplication and complex division using a common circuit.

In electronic circuits, many different types of operations need to be performed. Two of the operations that may need to be performed is complex division and complex multiplication. In complex division, one complex number, such as a+jb, is divided by a second complex number, such as c+jd, as per Equation 1.

$$\frac{(a+jb)}{(c+jd)} = \frac{(ac+bd)}{(c^2+d^2)} + j\frac{(bc-ad)}{(c^2+d^2)} \qquad \text{Equation 1}$$

In complex multiplication, one complex number, such as a+jb, is multiplied by a second complex number, such as c+jd, as per Equation 2.

$$(a+jb)*(c+jd)=(ac-bd)*j(ad+bc) \qquad \text{Equation 2}$$

Complex divisions and multiplications are necessary in many applications. A common application is in communications applications. In these systems, much of the processed information is in complex format requiring complex divisions and multiplications. To illustrate, data is commonly transmitted on an in-phase and quadrature carrier as complex data symbols.

Although complex division and multiplication can be performed by differing circuits, in many applications using two circuits is undesirable. In an integrated circuit environment, two circuits use up valuable silicon space. In a circuit board environment, two circuits require more components as well as requires more circuit board space.

Accordingly, it is desirable to have a circuit which can perform complex division and multiplication.

SUMMARY

A circuit is capable of performing a complex division and dual complex multiplication. The complex division involves dividing a first complex value by a second complex value and the dual complex multiplication involves multiplying a third complex value by a fourth complex value and a fifth complex value by a sixth complex value. The circuit comprises a first input configured to receive the first and second complex values when the circuit is performing the complex division and the third and fourth complex values when the circuit is performing the dual complex multiplication. A second input is configured to receive the second complex value when performing the complex division and the fifth and sixth complex values when performing dual complex multiplication. A first output produces a result of complex multiplication of the third and fourth complex values when the circuit is performing the dual complex multiplication. A second output produces a result of the complex division of the first complex value divided by the second complex value when the circuit is performing the complex division and complex multiplication of the fifth complex value by the sixth complex value when performing the dual complex multiplication.

DETAILED DESCRIPTION OF THE PREFERRED EMBODIMENT(S)

Figure 1:
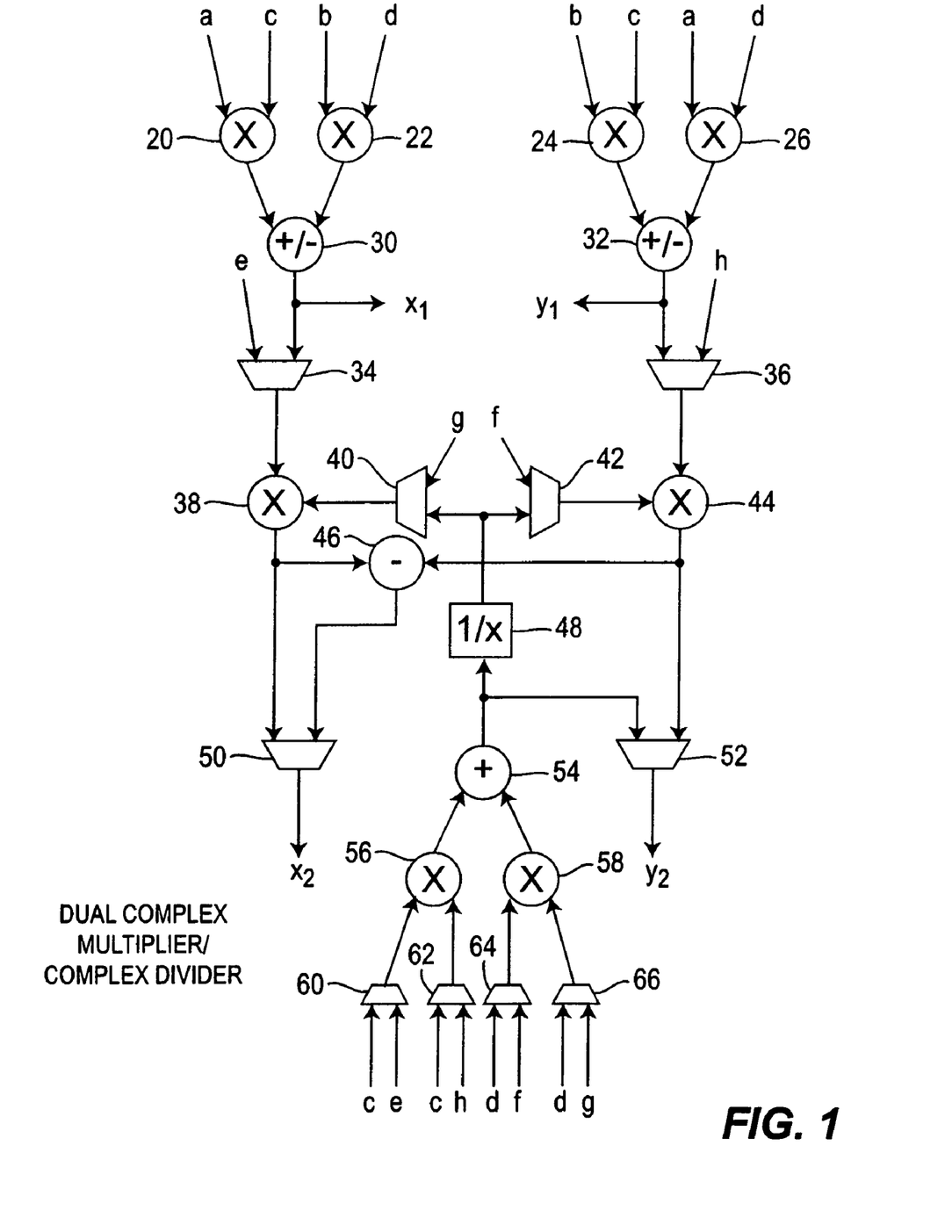
FIG. 1 is an embodiment of circuit capable of performing complex division and dual complex multiplication.

FIG. 1 is an illustration of a preferred embodiment of a circuit for performing both complex division and dual complex multiplication. The input values into the circuit are a, b, c, d, e, f, g, and h. For the complex division, the circuit performs a complex division on values a, b, c and d as per Equation 1.

$$\frac{(a+jb)}{(c+jd)} = \frac{(ac+bd)}{(c^2+d^2)} + j\frac{(bc-ad)}{(c^2+d^2)} \qquad \text{Equation 1}$$

The output values, x2 and y2, of the circuit are the results of the complex division as per Equations 3 and 4.

$$x2 = \frac{(ac+bd)}{(c^2+d^2)} \qquad \text{Equation 3}$$

$$y2 = \frac{(bc-ad)}{(c^2+d^2)} \qquad \text{Equation 4}$$

Accordingly, a result of the complex division is x2+jy2.

For the dual complex multiplications, the circuit performs a multiplication of (a+jb) to (c+jd) and a multiplication of (e+jf) to (g+jd) per Equations 2 and 5.

$$(a+jb)*(c+jd)(ac-bd)*j(ad+bc) \qquad \text{Equation 2}$$

$$(e+jf)*(g+jh)=(eg-fh)*j(eh+fg) \qquad \text{Equation 5}$$

The outputs x1 and y1 of the circuit is the result, x1+jy1, of the complex multiplication of (a+jb) to (c+jd) as per Equations 6 and 7.

$$x1=(ac-bd) \qquad \text{Equation 6}$$

$$y1=(ad+bc) \qquad \text{Equation 7}$$

The outputs x2 and y2 of the circuit is the result, x2+jy2, of the complex multiplication of (e+jf) to (g+jh) as per Equations 8 and 9.

$$x2=(eg-fh) \quad \text{Equation 8}$$

$$y2=(eh+fg) \quad \text{Equation 9}$$

To switch the preferred circuit between operating as a complex divider and a dual complex multiplier, two add/subtract components 30, 32 and ten multiplexers (MUXs) 34, 36, 40, 42, 50, 52, 60, 62, 64, 66 are used.

Figure 2:
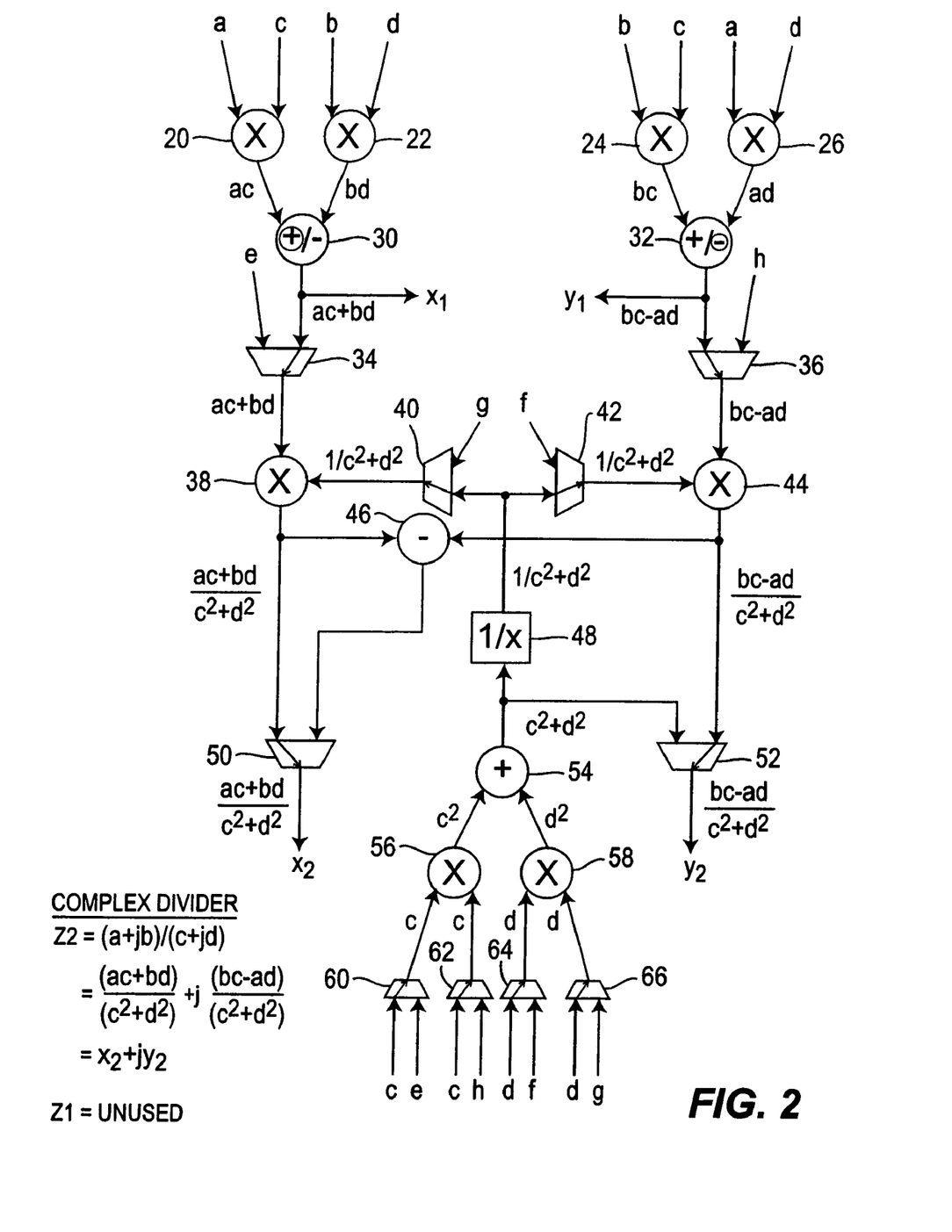
FIG. 2 is an illustration of the complex division processing of the circuit of FIG. 1.

FIG. 2 illustrates the operation of the preferred circuit as a complex divider. While operating as a complex divider, the circuit only needs the input values of a, b, c and d. The values of e, f, h and g do not matter. The four MUXs 60, 62, 64, 66 have inputs to values c, e, c, h, d, f, d, and g from left to right. As shown by a dashed arrow, the left input to each MUX is selected as the output of the MUX. To illustrate, the leftmost MUX 60 selects the c input and outputs c. As a result, the values c, c, d, and d are passed to two multipliers 56, 58. The e, h, f and g inputs to the MUXs are ignored.

The two multipliers 56, 58 multiply their input values together to produce $c^2$ and $d^2$. An adder 54 adds the multiplied results together, $c^2+d^2$. A reciprocal device 48 inverts the added result to produce $1/(c^2+d^2)$. Two MUXs 40, 42, 44 select their bottom inputs, ignoring their top inputs of g and f, and pass the inverted result, $1/(c^2+d^2)$, to respective multipliers 38, 44.

Referring to the upper left of FIG. 2, input values a, c, b and d are input to two multipliers 20, 22. After multiplication, results ac and bd are produced. The add/subtract component 32 operates as an adder, as shown by the circled "+", and produces ac+bd. Since only the results x2 and y2 are used by the complex divider, the value x1 is not used. A MUX 34 selects the added result, ac+bd to pass to the multiplier 38. The multiplier 38 multiplies the output, ac+bd, of MUX 38 to the output, $1/(c^2+d^2)$, of MUX 40 to produce $(ac+bd)/(c^2+d^2)$. A MUX 50 selects the produced $(ac+bd)/(c^2+d^2)$ as the real output of the complex divider x2.

Referring to the upper right of FIG. 2, input values b, c, a and d are input to two multipliers 24, 26. After multiplication, results bc and ad are produced. The add/subtract component 30 operates as a subtractor, as shown by the circled "−", and produces bc−ad. Since only the results x2 and y2 are used by the complex divider, the value y1 is not used. A MUX 36 selects the subtracted result, bc−ad to pass to the multiplier 44. The multiplier 44 multiplies the output, bc−ad, of MUX 36 to the output, $1/(c^2+d^2)$, of MUX 42 to produce $(bc-ad)/(c^2+d^2)$. A MUX 52 selects the produced $(bc-ad)/(c^2+d^2)$ as the imaginary output of the complex divider y2.

Accordingly, the complex divider results, x2 and y2, are determined. The complex divider well utilizes the components of the preferred circuit. The only unused component is subtractor 46.

Figure 3:
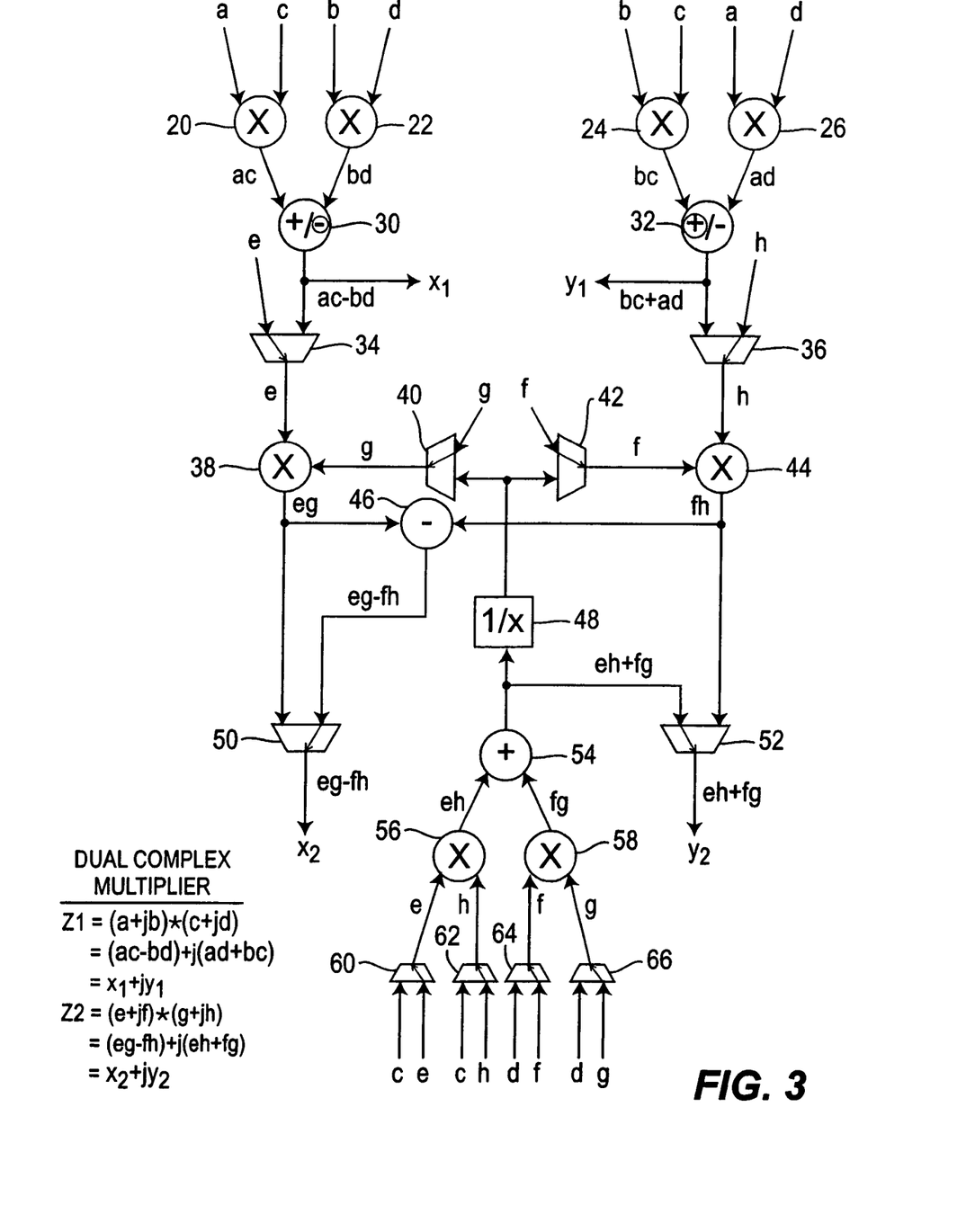
FIG. 3 is an illustration of the dual complex multiplication processing of the circuit of FIG. 1.

FIG. 3 illustrates the operation of the preferred circuit as a dual complex multiplier. While operating as a dual complex multiplier, the circuit uses all eight input values of a, b, c, d, e, f, g and h. Referring to the upper left of FIG. 3, the values a, c, b and d are input into two multipliers 20, 22 to produce ac and bd. The adder/subtractor 30 operates as a subtractor to produce ac−bd. ac−bd is output as the real output x1 of Equation 6.

Referring to the upper right of FIG. 3, the values b, c, a and d are input into two multipliers 24, 26 to produce bc and ad. The adder/subtractor 32 operates as an adder to produce bc+ad. bc+ad is output as the imaginary output y1 of Equation 7.

A MUX 36 selects and outputs value h. A MUX 42 selects and outputs value f. A multiplier 44 takes these outputs and multiplies them to produce fh. fh is input to a subtractor 46. A MUX 34 selects and outputs value e. A MUX 40 selects and outputs value g. A Multiplier 38 takes these outputs and multiplies them to produce eg. eg is input to the subtractor 46. The subtractor subtracts fh from eg to produce eg−fh. A MUX 50 selects eg−fh and outputs that value as the real output x2 of Equation 8.

The four MUXs 60, 62, 64, 66 have inputs to values c, e, c, h, d, f, d, and g from left to right. As shown by a dashed arrow, the right input to each MUX is selected as the output of the MUX. To illustrate, the leftmost MUX 60 selects the e input and outputs e. As a result, the values e, h, f and g are passed to two multipliers 56, 58. The c, c, d and d inputs to the MUXs are ignored.

The two multipliers 56, 58 multiply their input values together to produce eh and fg. An adder 54 adds the multiplied results together to produce eh+fg. A MUX 52 selects eh+fg and outputs that value as the imaginary output y2 of Equation 9.

Accordingly, the dual complex multiplier determines x1, y1, x2 and y2. The dual complex multipliers also well utilizes the components of the preferred circuit. The only unused component is the reciprocal device 48.

Although the dual multiplier is preferably used to process two complex multiplications simultaneously. It can be used to process one complex multiplication by only inputting a, b, c and d and taking only outputs x1 and y1 or only inputting e, f, g and h and taking only outputs x2 and y2.

One implementation of the preferred embodiment is in a receiver of a user equipment or a base station, such as in a time division duplex/code division multiple access, frequency division duplex/code division multiple access or time division synchronous code division multiple access communication system.

Figure 4:
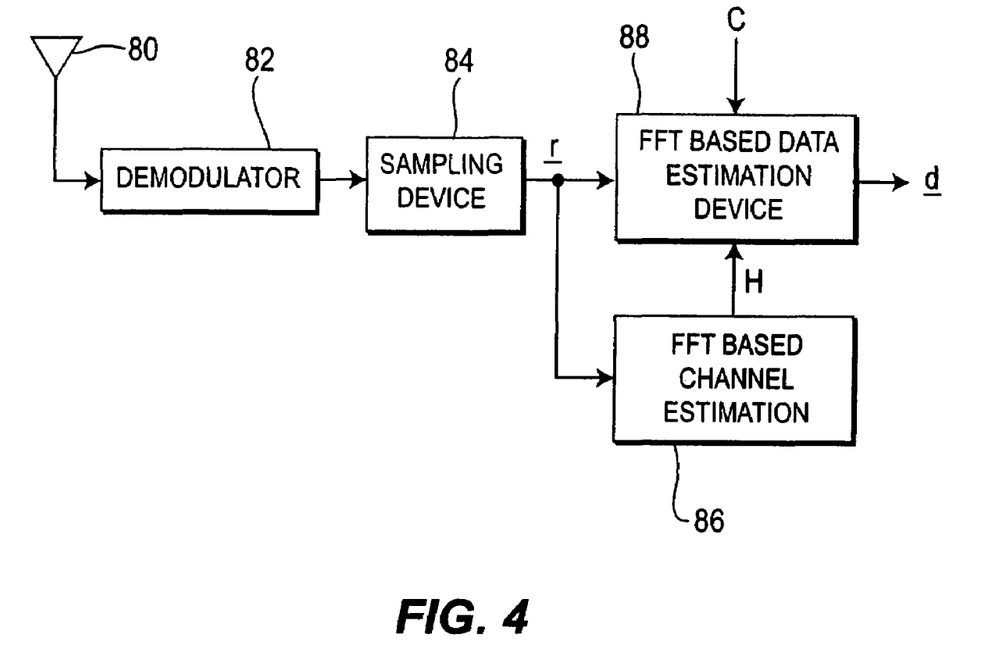
FIG. 4 is a simplified block diagram of a receiver utilizing a dual use dual complex multiplier and complex divider.

FIG. 4 is a simplified block diagram of such a receiver. At the receiver, a signal is received by an antenna 80 or antenna array. The signal has one or more communications transmitted in a code division multiple access format in a shared spectrum. The received signal is demodulated by a demodulator 82 to baseband. The baseband signal is sampled by a sampling device 84 at the chip rate or a multiple of the chip rate of the received signal, to produce a received vector, r. A fast Fourier transform (FFT) based channel estimation device 86 processes the samples to produce channel estimations for each received communication as a channel response matrix, H. The FFT based channel estimation device 86 uses the dual use dual multiplier and divider circuit in the channel estimation.

A FFT based data estimation device uses the received vector, r, code matrix, C, and channel estimation matrix, H, to estimate the received symbols as a data vector, d. For a multiuser detection approach to estimating the data vector, d, Equation 10 is used.

$$r = A \, d + n \quad \text{Equation 10}$$

A is the channel response matrix. A is constructed by convolving a line from the H matrix with one or multiple lines from the C matrix.

Two approaches to solve Equation 10 are a zero forcing solution per Equation 11 or a minimum mean square error solution per Equation 12.

$$d=(A^HA)^{-1}A^Hr \text{ or}$$

$$d=R^{-1}A^Hr, \text{ where } R=A^HA \qquad \text{Equation 11}$$

$$d=(A^HA+\sigma^2I)^{-1}A^Hr \text{ or}$$

$$d=R^{-1}A^Hr, \text{ where } R=A^HA+\sigma^2I \qquad \text{Equation 12}$$

$\sigma^2$ is the variance of the noise, n. I is the identity matrix and $(\cdot)^H$ indicates the conjugate transpose operation.

For a single user detection approach to estimating the data vector, d, Equation 13 is used.

$$r=H\,s+n \qquad \text{Equation 13}$$

s is the spread symbol vector per Equation 14.
s is the spread symbol vector per Equation 14.

$$s=C\cdot d \qquad \text{Equation 14}$$

Two approaches to solve Equation 13 are a zero forcing solution per Equation 15 or a minimum mean square error solution per Equation 16.

$$s=(H^HH)^{-1}H^Hr \text{ or}$$

$$s=R^{-1}H^H, \text{ where } R=H^HH \qquad \text{Equation 15}$$

$$d=(H^HH+\sigma^2I)^{-1}+H^Hr \text{ or}$$

$$d=R^{-1}+H^Hr, \text{ where } R=H^HH+\sigma^2I \qquad \text{Equation 16}$$

Using a circulant approximation for R, the data detection can be perform using FFTs for either multiuser detection or single user detection. In the FFT based solutions, the dual use dual multiplier and divider circuit is utilized to estimate the data vector, d.

What is claimed is:

1. A circuit capable of performing a complex division and dual complex multiplication, the complex division involving dividing a first complex value by a second complex value and the dual complex multiplication involving multiplying a third complex value by a fourth complex value and a fifth complex value by a sixth complex value, the circuit comprising:
   a first input configured to receive the first and second complex values when the circuit is performing the complex division and the third and fourth complex values when the circuit is performing the dual complex multiplication;
   a plurality of multipliers coupled to the first input for receiving real and imaginary components of the first and second complex values when the circuit is performing the complex division and the third and fourth complex values when the circuit is performing the dual complex multiplications;
   a second input configured for selecting the second complex value when performing the complex division and the fifth and sixth complex values when performing dual complex multiplication;
   a plurality of multiplexers coupled to the second input for selecting the real and imaginary components of the second complex value when the circuit is performing the complex division and real and imaginary components of the fifth and sixth complex values when circuit is performing the dual complex multiplication;
   circuitry coupled to the plurality of multiplexers the circuitry comprising:
   a first circuit comprising an adder/subtractor coupled to a MUX coupled to a multiplier coupled to a plurality of MUXes and a subtractor coupled to a MUX;
   a second circuit comprising an adder/subtractor coupled to a MUX coupled to a multiplier coupled to a plurality of MUXes and a subtractor;
   a divider coupled to said first and second circuits which is coupled to a MUX of said second circuit and an adder coupled to a plurality of multipliers;
   a first output for producing a result of complex multiplication of the third and fourth complex values when the circuit is performing the dual complex multiplication; and
   a second output for producing a result of the complex division of the first complex value divided by the second complex value when the circuit is performing the complex division and complex multiplication of the fifth complex value by the sixth complex value when performing the dual complex multiplication.

2. The circuit of claim 1 wherein the plurality of multiplexers are coupled to a plurality of multipliers.

3. The circuit of claim 1 wherein the plurality of multipliers are coupled to add/subtract circuits which change from operating as either an adder or a subtractor when the circuit is performing the complex division and an other of the adder or the subtractor when performing the dual complex multiplication.

4. A user equipment comprising:
   a channel estimation device having an input configured to receive samples of a signal including a plurality of communications and for producing channel estimates for the communications using a fast Fourier transform based approach, the channel estimation device utilizing a circuit capable of performing a complex division and dual complex multiplication, the complex division involving dividing a first complex value by a second complex value and the dual complex multiplication involving multiplying a third complex value by a fourth complex value and a fifth complex value by a sixth complex value, the circuit comprising:
   a first input configured to receive the first and second complex values when the circuit is performing the complex division and the third and fourth complex values when the circuit is performing the dual complex multiplication;
   a plurality of multipliers coupled to the first input for selecting real and imaginary components of the first and second complex values when the circuit is performing the complex division and the third and fourth complex values when the circuit is performing the dual complex multiplications;
   a second input configured for selecting the second complex value when performing the complex division and the fifth and sixth complex values when performing dual complex multiplication;
   a plurality of multiplexers coupled to the second input for receiving the real and imaginary components of the second complex value when the circuit is performing the complex division and real and imaginary components of the fifth and sixth complex values when circuit is performing the dual complex multiplication;
   circuitry coupled to the plurality of multiplexers the circuitry comprising
   a first circuit comprising an adder/subtractor coupled to a MUX coupled to a multiplier coupled to a plurality of MUXes and a subtractor coupled to a MUX;
   a second circuit comprising an adder/subtractor coupled to a MUX coupled to a multiplier coupled to a plurality of MUXes and a subtractor;

a divider coupled to said first and second circuits which is coupled to a MUX of said second circuit and an adder coupled to a plurality of multipliers;

a first output for producing a result of complex multiplication of the third and fourth complex values when the circuit is performing the dual complex multiplication; and a second output for producing a result of the complex division of the first complex value divided by the second complex value when the circuit is performing the complex division and complex multiplication of the fifth complex value by the sixth complex value when performing the dual complex multiplication.

5. The user equipment of claim 4 wherein the plurality of multiplexers are coupled to a plurality of multipliers.

6. The user of claim 4 wherein the plurality of multipliers are coupled to add/subtract circuits which change from operating as either an adder or a subtractor when the circuit is performing the complex division and an other of the adder or the subtractor when performing the dual complex multiplication.

7. A base station comprising:

a channel estimation device having an input configured to receive samples of a signal including a plurality of communications and for producing channel estimates for the communications using a fast Fourier transform based approach, the channel estimation device utilizing a circuit capable of performing a complex division and dual complex multiplication, the complex division involving dividing a first complex value by a second complex value and the dual complex multiplication involving multiplying a third complex value by a fourth complex value and a fifth complex value by a sixth complex value, the circuit comprising:

a first input configured to receive the first and second complex values when the circuit is performing the complex division and the third and fourth complex values when the circuit is performing the dual complex multiplication;

a plurality of multipliers coupled to the first input for selecting real and imaginary components of the first and second complex values when the circuit is performing the complex division and the third and fourth complex values when the circuit is performing the dual complex multiplications;

a second input configured for selecting the second complex value when performing the complex division and the fifth and sixth complex values when performing dual complex multiplication;

a plurality of multiplexers coupled to the second input for receiving the real and imaginary components of the second complex value when the circuit is performing the complex division and real and imaginary components of the fifth and sixth complex values when circuit is performing the dual complex multiplication;

circuitry coupled to the plurality of multiplexers the circuitry comprising a first circuit comprising an adder/subtractor coupled to a MUX coupled to a multiplier coupled to a plurality of MUXes and a subtractor coupled to a MUX;

a second circuit comprising an adder/subtractor coupled to a MUX coupled to a multiplier coupled to a plurality of MUXes and a subtractor;

a divider coupled to said first and second circuits which is coupled a final MUX of said second circuit and an adder coupled to a plurality of multipliers;

a first output for producing a result of complex multiplication of the third and fourth complex values when the circuit is performing the dual complex multiplication; and a second output for producing a result of the complex division of the first complex value divided by the second complex value when the circuit is performing the complex division and complex multiplication of the fifth complex value by the sixth complex value when performing the dual complex multiplication.

8. The base station of claim 7 wherein the plurality of multiplexers are coupled to a plurality of multipliers.

9. The base station of claim 7 wherein the plurality of multipliers are coupled to add/subtract circuits which change from operating as either an adder or a subtractor when the circuit is performing the complex division and an other of the adder or the subtractor when performing the dual complex multiplication.

* * * * *

UNITED STATES PATENT AND TRADEMARK OFFICE
CERTIFICATE OF CORRECTION

PATENT NO. : 7,051,061 B2
APPLICATION NO. : 10/744829
DATED : May 23, 2006
INVENTOR(S) : Peter E. Becker It is certified that error appears in the above-identified patent and that said Letters Patent is hereby corrected as shown below:

At column 2, Equation 2, delete "Equation 2" and insert therefor
--$(a+jb)*(c+jd)=(ac-bd)*j(ad+bc)$--.

At column 3, line 26, after "40, 42", delete "44".

At column 4, line 31, after the word "simultaneously", delete ". It" and insert therefor --, it--.

At column 4, line 39, after the word "division", delete "synchronous code" and insert therefor -- synchronous/code--.

At column 4, line 48, after the word "vector", delete "r." and insert therefor --$\underline{r}$.--.

At column 4, line 55, before "FFT", delete "A" and insert therefor--An--.

At column 4, line 56, after the word "vector", delete "r," and insert therefor --$\underline{r}$,--.

At column 4, line 57, after the word "vector", delete "d." and insert therefor --$\underline{d}$.--.

At column 4, Equation 10, delete "Equation 10" and insert therefor --$\underline{r}=A\underline{d}+n$--.

At column 5, Equation 11, delete Equation 11, and insert therefor
--$\underline{d} = (A^H A)^{-1} A^H \underline{r}$ or
$\underline{d} = R^{-1} A^H \underline{r}$, where $R = A^H A$--.

At column 5, Equation 12, delete Equation 12, and insert therefor
--$\underline{d} = (A^H A + \sigma^2 I)^{-1} A^H \underline{r}$ or
$\underline{d} = R^{-1} A^H \underline{r}$, where $R = A^H A + \sigma^2 I$--.

At column 5, line 8, after the word "noise", delete "n." and insert therefor --$\underline{n}$--.

At column 5, Equation 13, delete Equation 13, and insert therefor --$\underline{r} = H\underline{s} + n$--.

At column 5, line 14, delete line 14. (duplicate)

At column 5, line 15, before the words "is the spread", delete "s" and insert therefor --$\underline{s}$--.

UNITED STATES PATENT AND TRADEMARK OFFICE
CERTIFICATE OF CORRECTION

PATENT NO.        : 7,051,061 B2
APPLICATION NO. : 10/744829
DATED             : May 23, 2006
INVENTOR(S)       : Peter E. Becker It is certified that error appears in the above-identified patent and that said Letters Patent is hereby corrected as shown below:

At column 5, Equation 14, delete "Equation 14", and insert therefor $--\underline{s} = C \cdot \underline{d}--$.

At column 5, Equation 15, delete Equation 15, and insert therefor
$--\underline{s} = (H^H H)^{-1} H^H \underline{r}$ or
$\underline{s} = R^{-1} H^H \underline{r}$, where $R = H^H H--$.

At column 5, Equation 16, delete Equation 16, and insert therefor
$--\underline{d} = (H^H H + \sigma^2 I)^{-1} A^H \underline{r}$ or
$\underline{d} = R^{-1} + H^H \underline{r}$, where $R = H^H H + \sigma^2 I--$.

At column 5, line 29, after the words "can be", delete "perform" and insert therefor --performed--.

At column 5, line 32, after the word "vector" delete "d." and insert therefor $--\underline{d}--$.

At claim 7, column 8, line 22, after the word "coupled", delete "a final" and insert therefor --to a--.

Signed and Sealed this

Second Day of January, 2007

JON W. DUDAS
*Director of the United States Patent and Trademark Office*